Dec. 26, 1922.

B. D. LOCKWOOD.
SPEED CONTROLLING DEVICE FOR SHAFTS.
FILED SEPT. 28, 1920.

Inventor
B. D. Lockwood,
By Bakewell, Byrnes Parmelee
his Attorneys

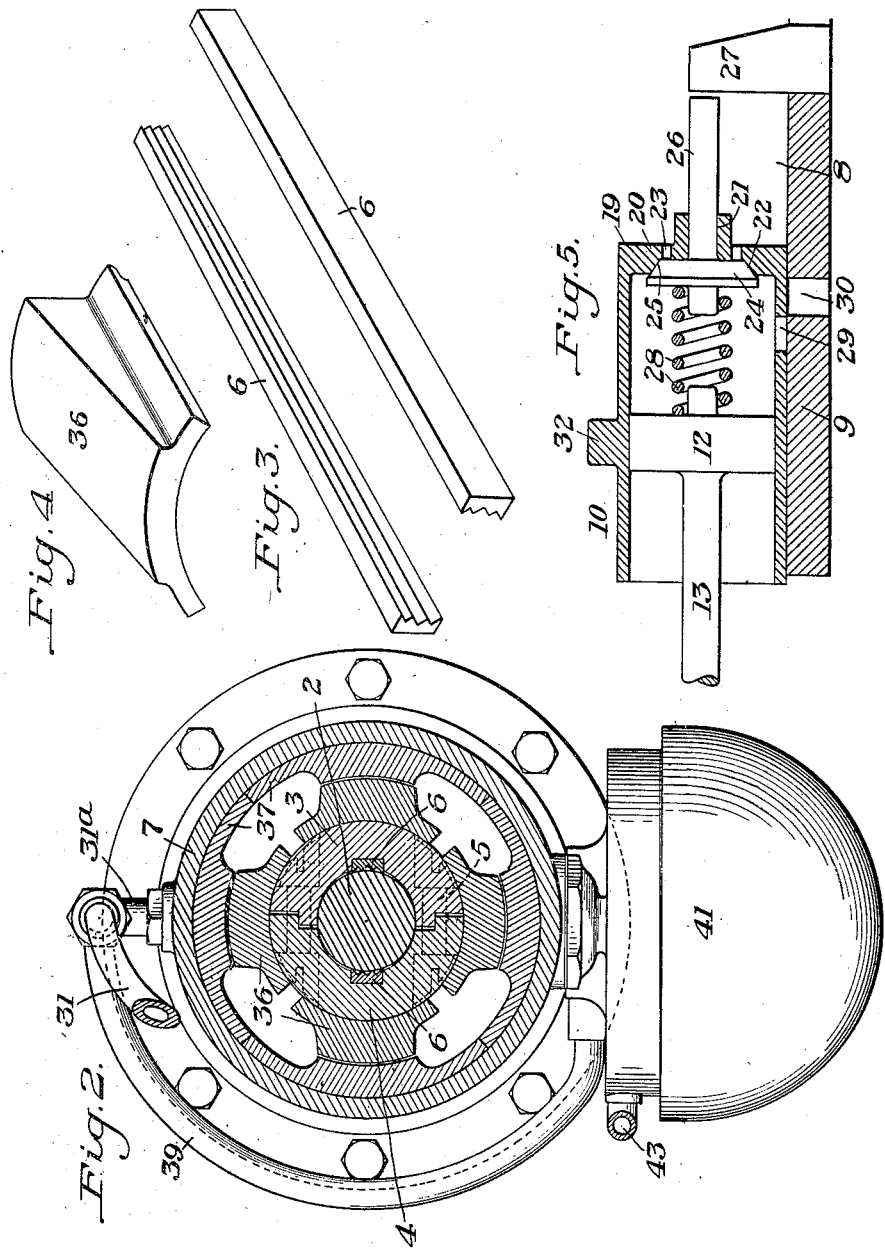

Patented Dec. 26, 1922.

1,439,827

UNITED STATES PATENT OFFICE.

BURNS D. LOCKWOOD, OF BELLEVUE, PENNSYLVANIA.

SPEED-CONTROLLING DEVICE FOR SHAFTS.

Application filed September 28, 1920. Serial No. 413,431.

*To all whom it may concern:*

Be it known that I, BURNS D. LOCKWOOD, a citizen of the United States, residing at Bellevue, Allegheny County, Pennsylvania, have invented a new and useful Improvement in Speed-Controlling Devices for Shafts, of which the following is a full, clear, and exact description, reference being had to the accompanying drawings, forming part of this specification, in which:—

Figure 2 is a section on the line II—II of Figure 1.

Figure 3 is a perspective view of the shaft gripping members removed.

Figure 4 is a perspective view of one of the wedge members, and

Figure 5 is a section on an enlarged scale, illustrating the construction of the pump.

Figure 1:
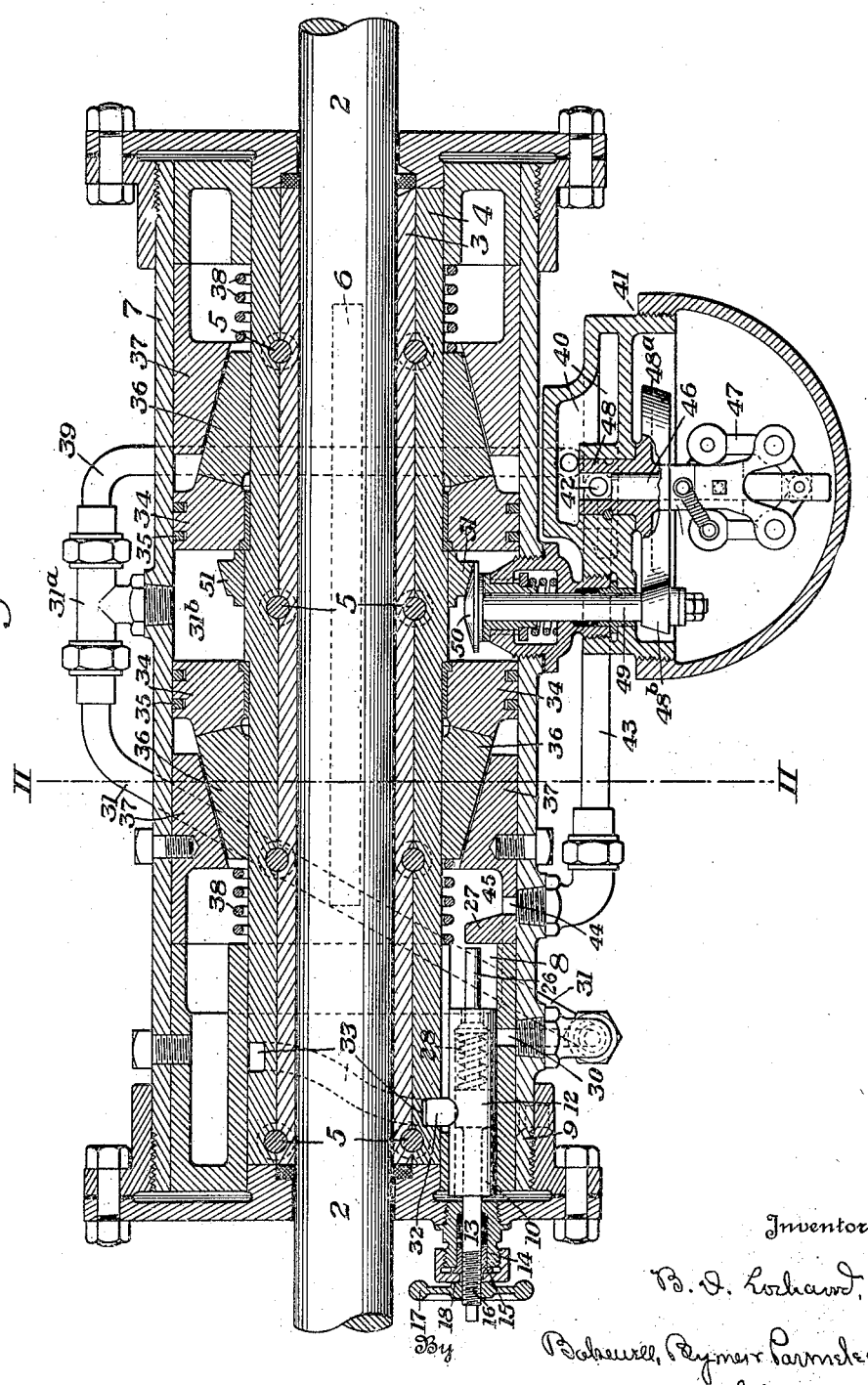
Figure 1 is a longitudinal section of a device embodying my invention.

My invention has relation to speed controlling devices for shafts and other rotary members; and is designed to provide means of simple and efficient character which is capable of a variety of applications to rotating shafts or similar members, the speed of which should not exceed a variable predetermined maximum.

The nature of my invention will be best understood by reference to the accompanying drawings in which I have shown a preferred embodiment of my invention and which will now be described, it being premised, however, that various changes can be made in the details of construction, arrangement and combination of the various parts without departing from the spirit and scope of my invention as defined in the appended claims.

In these drawings the numeral 2 designates a rotary shaft whose speed is to be controlled by the device constituting my invention.

3 and 4 designate the two complementary and interfitting half sections of a split bushing which is clamped upon the shaft 2, by any suitable means such as the bolts 5. Each half of the split bushing member is provided with a corrugated or toothed gripping member 6 recessed in the bushing member, and adapted to grip the shaft and thereby insure a rigid rotative engagement between the shaft and the complete bushing member.

7 designates an outer casing or shell surrounding the shaft and bushing and containing most of the operating parts now to be described.

8 indicates a pump of special and novel construction and in which 9 indicates the working barrel or cylinder. 10 indicates a piston adapted to reciprocate within the barrel 9, said piston being of hollow cylindricel form, its outer surface forming a working fit within the working barrel 9. Inside the hollow piston 10, an adjustable stationary member 13 is provided, said member having an enlarged cylindrical portion 12, forming a working fit with the interior surface of the hollow piston 10. The enlarged portion 12 is provided at one end with a smaller extension portion 13 which passes through the stuffing box 14 and packing gland 15, and for purpose of adjustment its outer end portion 16 is threaded and adapted to be engaged by the threaded boss of the hand-wheel 17, the inner face 18 of the boss being adapted to engage the face of the packing gland 15.

One end 19 of the hollow piston 10 is provided with an inwardly extending portion 20, which is perforated at its center 21 and provided with a preferably beveled valve seat 22, and also a series of smaller perforations 23, spaced in the metal surrounding the central perforation. Inside the hollow piston 10 a valve member 24 is provided, having a surface 25 complementary to the valve seat 22, and also having a smaller extension portion 26, which is adapted to pass through the perforation 21, and is of sufficient length to contact with the stop 27. When the portion 26 engages the stop 27 the valve 24 is opened to admit oil or other circulating medium into the hollow piston 10. Between the cylindrical portion 12 above referred to and the valve 24, a spring or resilient member 28 is interposed for the purpose of exerting the amount of pressure desired between the valve member 24 and the valve seat 22. The end portion of the hollow cylindrical piston 10 is furnished with an opening or port 29 located near to the valve seat 22, said port registering, at a desired point in its stroke, with an outlet port 30 located in the working barrel 9, which port 30 is operatively connected with pipe 31.

The hollow piston member 10 is provided with a stud or projection 32 which is adapted to engage a cam groove 33 formed in the bushing 3—4 heretofore described, and which is arranged, as the bushing is rotated, to cause a reciprocating movement of the piston 10 in the working barrel 9 and thereby accomplish a pumping action. The pipe connection 31 to the outlet port 30 is connected with a T 31$^a$ mounted on the casing or shell 7, which T 31$^a$ has one of its branches communicating with a chamber 31$^b$ formed within the central portion of said casing. The inlet from this connection is intermediate two pistons 34, 34 each of which is furnished with the usual packing rings 35. Each of these pistons is arranged to act upon a series of sectional tapering cylindrical wedge members 36 seated upon the bushing 3—4 and adapted to be moved by said pistons into wedging engagement with relatively stationary wedge members 37 which are secured within the casing 7, these wedge members being maintained out of engagement with each other when desired by the springs 38.

The third branch of the T 31$^a$, is connected by a pipe 39 with the chamber 40 of a supplemental casing 41. The chamber 40 is provided with an outlet port 42 which is connected by a pipe 43 with a port 44, leading to an extension 45 of the pump barrel 9, thus completing the circuit of said pump. The port 42 is arranged to be controlled by a valve member 46 which is actuated by a centrifugal governor 47 of any suitable type. This governor is carried by a sleeve 48 surrounding the valve stem and having thereon a bevel friction wheel 48$^a$ which is driven by a bevel friction wheel 48$^b$ on the shaft 49. The shaft 49 extends within the main casing 7 and carries a friction gear 50 at its upper end which engages a friction wheel 51 fixedly secured to the bushing 3—4 before described.

The operation is as follows: The rotation of the shaft 2 and its bushing causes a continued action of the pump, the capacity of which is fixed for the desired speed by a proper adjustment of the screw 16. The action of this pump causes a circulation through the pipe 31, T 31$^a$, chamber 31$^b$, pipe 39 and chamber 40 and pipe 43. Should the speed of the shaft exceed the predetermined maximum, the centrifugal governor 47 will, by reason of such increased speed, act upon the valve member 46 to throttle the outlet port 42 to a greater or less extent, depending upon the extent to which the speed is increased. This throttling effects a restriction of the pump circulation, thereby creating an increased pressure within the chamber 31$^b$. This increased pressure, acting upon the pistons 34, forces the wedge members 36 into wedging engagement with the relatively fixed wedge members 37 against the action of the springs 38. This causes said wedge members to exert a rapidly increasing friction upon the surface of the bushing which is effective as a braking action to slow down the speed of rotation of the shaft 2.

In practice the movement of the parts, if properly initially adjusted, will be comparatively slight by reason of the fact that a slight increase of speed beyond the predetermined maximum will at once cause an action tending to correct itself; so that the speed of the shaft is slowed down to the proper limit before any great increase has occurred.

The advantages of my invention will be apparent since it provides a speed governor for shafts and the like which is simple in its construction and positive in its operation and in which any increase in the speed of the rotating shaft is utilized to correct such increase.

I claim:

1. A speed controlling device for shafts, comprising a shaft whose speed is to be controlled, members arranged to be moved longitudinally of said shaft to exert a braking action on said shaft, and means operable by said shaft for actuating said braking members, substantially as described.

2. A speed controlling device for shafts, comprising a shaft whose speed is to be controlled, members arranged to be moved longitudinally of said shaft to exert a braking action on said shaft, and fluid pressure means to actuate said braking members, substantially as described.

3. A speed controlling device for shafts, comprising a shaft whose speed is to be controlled, means adapted to be moved longitudinally of said shaft for exerting pressure on said shaft, and a fluid pressure device operable by said shaft for actuating said means, substantially as described.

4. A speed controlling device for shafts, comprising a shaft whose speed is to be controlled, members arranged to be moved longitudinally of said shaft to exert a braking action on said shaft, and fluid pressure means actuated by said shaft to actuate said braking members, substantially as described.

5. A speed controlling device for shafts, comprising a shaft whose speed is to be controlled, members arranged to be moved longitudinally of said shaft to exert a braking action on said shaft, fluid pressure means actuated by said shaft to actuate said braking members, and means controlled by the speed of the shaft to regulate said fluid pressure, substantially as described.

6. A speed controlling device for shafts, comprising a shaft whose speed is to be controlled, members arranged to be moved longitudinally of said shaft to exert a braking action on said shaft, fluid pressure means actuated by said shaft to actuate said braking members, and regulating means for said fluid pressure means, substantially as described.

7. A speed controlling device for shafts, comprising a shaft whose speed is to be controlled, members arranged to exert a braking action on said shaft, fluid pressure means actuated by said shaft to actuate said braking members, and regulating means for said fluid pressure means whereby the speed of the shaft is regulated, substantially as described.

8. A speed controlling device for shafts, comprising a shaft whose speed is to be controlled, members arranged to exert a braking action on said shaft, wedge shaped means for causing said members to exert pressure on said shaft, and means controlled by the speed of the shaft for moving said wedge shaped members substantially as described.

9. A speed controlling device for shafts, comprising a shaft whose speed is to be controlled, members adapted to be moved longitudinally of and into engagement with said shaft to exert a braking action on said shaft when the shaft has attained substantially its predetermined maximum speed, and adapted to disengage from said shaft when the speed has been reduced, fluid pressure means for causing said members to engage said shaft, and means separate from and independent of the fluid pressure means for causing said members to disengage from said shaft, substantially as described.

10. A speed controlling device for shafts, comprising a shaft whose speed is to be controlled, members adapted to engage with said shaft and exert a braking action thereon when the shaft has attained substantially its predetermined maximum speed, and adapted to disengage from said shaft when the speed of the shaft has been reduced, wedge shaped means for causing said members to engage said shaft, fluid pressure means for operating said wedge shaped means to cause said members to engage said shaft, and spring means for operating said wedge shaped means to cause said members to disengage from said shaft, substantially as described.

11. A speed controlling device for shafts, comprising a shaft whose speed is to be controlled, members adapted to engage and disengage said shaft, wedge means for operating said members, fluid pressure means for operating said wedge means to cause said members to engage said shaft when said shaft has attained substantially a predetermined maximum speed, and means other than said fluid pressure means for operating said wedge means to cause said members to disengage said shaft when the speed of the shaft has been reduced.

12. A speed controlling device for shafts, comprising a shaft whose speed is to be controlled, members adapted to be moved longitudinally and into engagement with said shaft, means operable by fluid pressure for moving said members when said shaft has attained substantially its predetermined maximum speed, and means combined in said device whereby the speed of shaft may be adjusted to any predetermined speed, substantially as described.

13. A speed controlling device for shafts, comprising a shaft whose speed is to be controlled, members adapted to engage said shaft when the shaft has attained a predetermined maximum speed, wedge shaped means for moving said members, pistons for operating said wedge means, fluid pressure means for moving said pistons, said fluid pressure means comprising a cylinder in which said pistons are operated, a fluid pressure chamber outside said cylinder, a fluid pressure pump, pipe connections from said pump to said cylinder and to said chamber, a connection from said chamber to said pump, and means for automatically controlling the flow of fluid through the last mentioned connection whereby the pressure in said cylinder is automatically varied, substantially as described.

14. A speed controlling device for shafts, comprising a shaft whose speed is to be controlled, members adapted to engage said shaft when the shaft has attained a predetermined maximum speed, wedge shaped means for moving said members, pistons for operating said wedge means, fluid pressure means for moving said pistons, said fluid pressure means comprising a cylinder in which said pistons are operated, a fluid pressure chamber outside said cylinder, a fluid pressure pump, pipe connections from said pump to said cylinder and to said chamber, a connection from said chamber to said pump, and a centrifugal governor in said chamber operable by said shaft adapted to regulate the flow of fluid through the last mentioned connection, substantially as described.

15. A speed controlling device for shafts, comprising a shaft whose speed is to be controlled, members adapted to engage said shaft when the shaft has attained a predetermined maximum speed, wedge shaped means for moving said members, pistons for operating said wedge means, fluid pressure means for moving said pistons, said fluid pressure means comprising a cylinder in which said pistons are operated, a fluid pressure pump, a supply connection from said pump to said cylinder, a return connection from said cylinder to said pump, and means interposed in said return connection for automatically controlling the return flow of fluid to said pump, substantially as described.

In testimony whereof I have hereunto set my hand.

BURNS D. LOCKWOOD.